United States Patent [19]

Ferguson

[11] Patent Number: 5,287,513
[45] Date of Patent: Feb. 15, 1994

[54] MULTIPLEX DATA RING TRANSMISSION

[75] Inventor: Stephen P. Ferguson, Coventry, England

[73] Assignee: GPT Limited, England

[21] Appl. No.: 848,382

[22] Filed: Mar. 9, 1992

[30] Foreign Application Priority Data

Mar. 22, 1991 [GB] United Kingdom ............... 9106101

[51] Int. Cl.⁵ ................................................. H04J 1/10
[52] U.S. Cl. ..................................... 370/55; 370/16.1; 370/100.1
[58] Field of Search ............. 370/55, 60, 85.12, 85.15, 370/16, 60.1, 58.3, 16.1, 100.1, 102

[56] References Cited

U.S. PATENT DOCUMENTS

| | | | |
|---|---|---|---|
| 4,468,767 | 8/1984 | Warren et al. | 370/55 |
| 4,935,920 | 6/1990 | Taniguchi et al. | 370/85.15 |
| 5,018,135 | 5/1991 | Ashi et al. | 370/85.12 |
| 5,033,044 | 7/1991 | Williams et al. | 370/55 |

Primary Examiner—Douglas W. Olms
Assistant Examiner—Shick Hom
Attorney, Agent, or Firm—Kirschstein

[57] ABSTRACT

A data transmission system in which multiplex data is created in accordance with the Synchronous Digital Hierarchy standard includes an add-drop multiplex having a switch across which data streams are switched between a pair of multiplexers and each input and output for a stream has a rejustifier circuit the timing of which is extracted from a timing extract from the other side of the switch.

4 Claims, 4 Drawing Sheets

Fig.1.
PRIOR ART (a) 125 MICROSECONDS — ROW 1-9

(b) 9 ROWS × 270 COLUMNS
- EACH BOX = 1 BYTE, EQUIVALENT TO 64 KBIT/S CAPACITY.
- FRAME ALIGNMENT WORD
- 9 COLUMNS OF OVERHEADS

MULTIPLEX DATA RING TRANSMISSION

BACKGROUND OF THE INVENTION

1. Field of the Invention

The present invention concerns data transmission, and is particularly, though not exclusively, concerned with the transmission of multiplexed data over a ring, the data having been created in accordance with the Synchronous Digital Hierarchy (SDH) as described in CCITT Recommendations G707, G708 and G709. The description applies equally to the CCITT SDH standard and to the N.American SONET standard; these are closely-related variants of synchronous multiplexing, differing somewhat in terminology.

2. Description of the Related Art

One of the advantages of a ring is the possibility it provides for geographical diversity to overcome a break in the transmission path, allowing transmission to occur via either of two routes around the ring. Protection can be provided by sending traffic in either direction and selecting from the appropriate direction at the destination receiver.

This selection may be by management command or may occur automatically after a break is detected. In either case, transmission may be in one direction at a time or in both directions simultaneously. The latter has the advantage that the receiver does not need to delay protection while it exchanges messages for control purposes with the transmitter or with a common management centre, since a simple changeover switch at the receiver can be triggered by the detection of a corruption on the initially received traffic.

In this respect, the protection described is similar to the well known "twinpath" or "I +1" protection, commonly used for the protection of line and radio systems.

SUMMARY OF THE INVENTION

The present invention is intended to allow for more flexible routing of traffic and also to remove the need for duplication of certain equipment functions in the case of simultaneous transmission in both directions on a ring. The need for this duplication arises as a result of a particular requirement by certain telecommunications administrations for timing information to be sent around the ring in a contradirectional fashion.

In accordance with the present invention there is provided an add-drop multiplex for use in SDH Data transmission comprising a switch across which the data streams between a pair of multiplexes are switched, and in which each input and output for a stream to be switched has a rejustifier circuit, the timing for each output rejustifier circuit being extracted from the other side of the switch.

BRIEF DESCRIPTION OF THE DRAWINGS

In order that the present invention may be more readily understood, an embodiment thereof will now be described together with a number of prior art arrangements, this description being by way of example and with reference to the accompanying drawings, in which:

FIG. 1 is a diagram representing an SDH frame and how it can be represented as rows and columns.

DETAILED DESCRIPTION OF THE PREFERRED EMBODIMENTS

Figure 2:
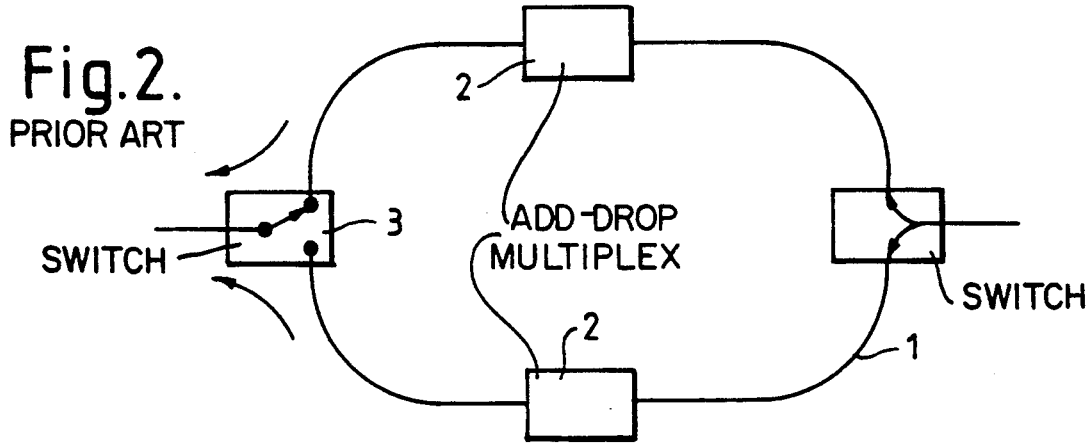
FIG. 2 is a diagram representing a simple ring transmission system.

Before describing the present invention there will be given a brief description of the background and terminology of data transmission in the SDH environment.

The basic unit in which TDM (Time Division Multiplex) data is sent is known as a frame. The SDH has a repetitive frame structure with a period of 125 microseconds, the frame consisting of nine equal length segments with a burst of overhead bytes at the start of each one. The remaining bytes contain a mixture of traffic and further overheads, depending on the types of traffic being carried. The overall length of each segment is 2430 bytes, with each overhead burst lasting nine bytes. Such a frame is shown in FIG. 1(a).

In contrast to the plesiochronous digital hierarchy, which uses bit interleaving, SDH uses byte interleaving in order to support 64 kbit/s cross-connection.

FIG. 1(b) shows how the frame is conventionally represented, derived from the self-evident representation of FIG. 1(a). From the figure, the nine equal length segments are called rows, and it is conventional that each separate tributary to the multiplex has its own payload area, occupying a number of complete columns. The first nine columns are the common overhead area for the transport frame.

Since the tributary signals are normally continuous, and the rows occur in sequence, the columns occupied by one tributary are relatively evenly spaced through the frame so as to minimise storage and consequent delay.

Each column contains nine bytes, one from each row, with each byte representing 64 kbit/s of capacity, or a total of 576 kbit/s per column. From this one can see something of how the standard emerged to support both N. American and European rates. Three columns or 27 bytes can hold a N. American 1.5 Mbit/s pcm signal with 24 time slots (i.e. 24×64 kbit/s), together with some overheads, while four columns or 36 bytes can similarly carry a European 2 Mbit/s pcm signal with 32 time slots.

When an incoming plesiochronous tributary signal reaches an SDH multiplexer, it undergoes a process of "pulse stuffing" or "justification", so as to match the synchronous multiplexer bit rate, in a manner related to that for plesiochronous multiplexes, and the composite signal is called a container (C). In SDH, this process is called mapping. Overheads are added for network management, called path overheads (POH), and the new composite is called a virtual container (VC). This travels through the network as a complete package to the point where demultiplexing occurs.

Once it has been assembled, it is important that the VC suffer as little delay as possible in subsequent transmission, and so when VC meet in a multiplexer or cross-connect, they must not be aligned by having different delays applied.

Instead, the start point of each VC is indicated by a pointer, unique to each VC, and new pointer values are calculated when incoming VCs are multiplexed together. These pointers are in known places in the frame, so they can be found simply by counting clock pulses once the frame has been located.

As VCs travel across networks, being remultiplexed and exposed to network timing variations, each VC is allowed to float or spread between two frames, constantly tracked by its pointer in the first frame. These timing variations are the result of jitter, wander and occasional losses of synchronisation, the latter possibly caused accidentally or by transmission between independent networks.

The plesiochronous hierarchy has no synchronisation, and has to locate its lower order frames floating inside higher order ones; it does this by using nested frame alignment words. While these could have been used in SDH to track VCs, pointers were made a feature of SDH because of the greater ease with which they could support multiple sizes of payload.

When a change in pointer value occurs, the VC effectively slips in relation to its transport frame, but no errors occur. This is different from the well known frame slip associated with the frame buffer of an exchange, where data bits are lost but frame alignment is preserved, by losing or repeating a frame. With SDH, each pointer value change involves either the insertion of extra data bytes in a payload area reserved for this, or the omission of a data byte from a defined position. Appropriate message bytes allow the reconstruction of the original signal at the destination demultiplexer. This process is equivalent to justification, and is a variant of the method used in mapping a plesiochronous signal into an SDH container.

A VC plus its pointer constitute a tributary unit (TU), known as a virtual tributary (VT) in SONET. Each TU consists of the quantity of bytes corresponding to an integral number of columns in the payload area; when created, each TU nominally occupies a number of whole columns, but as the VC part of the TU traverses the network, it tends to spread between two frames. The pointer part of the TU resides in a known area of the first frame, with its value being recalculated at each cross-connect or add-drop multiplex so as to keep track of the VC.

Virtual containers come in two types, basic and higher order, depending on the tributary bit rate supported. Alternatively, a higher order VC may be filled by a quantity of identical lower order VCs. Each higher order VC remains intact in its passage across networks until regrouping of its component TU traffic is required, such as for example for service protection, where traffic may be offered alternative routing around a fault, depending on the priority of that traffic. However, for many network administration functions, such as protection switching and provision of trunk traffic capacity, traffic can remain in its higher order VC form.

As mentioned previously, transmission delay must be minimised, and pointers are accordingly used to indicate the start of each higher order VC. Each higher order VC together with its pointer again constitutes a TU.

Higher order VC are dimensioned so that the two different sizes of VC can occupy nominally ⅓ or else the whole of the payload area of the transport frame. These options are known as VC-3, VC-4, because they were designed to carry third order multiplex traffic—European 34 Mbit/s or N. American 45 Mbit/s and fourth order multiplex traffic at 140 Mbit/s.

In contrast to the SDH, SONET does not have higher order VCs, but does have an equivalent to VC-3, called a synchronous payload envelope (SPE) and dedicated to carry a single stream of 45 Mbit/s; SONET has no provision for 34 Mbit/s.

Rather than being combined with its pointer to fill the space of a TU, a higher order VC can be combined with a differently located pointer so as to occupy a new entity, an administrative unit or AU. The key difference in structure between a TU and an AU is that the latter has its pointers in a fixed place in the transport frame, while the former has its pointers in a larger VC, which itself floats between frames as part of an AU.

The importance of this difference lies in the operation of cross-connects and add-drop multiplexes. At the higher levels of network administration, there is no need to access the contents of a higher order VC, but there is a need to recalculate its pointer value in a cross-connect or add-drop multiplex. Having the pointers in a group in a fixed place in the transport frame simplifies that process.

Figure 3:
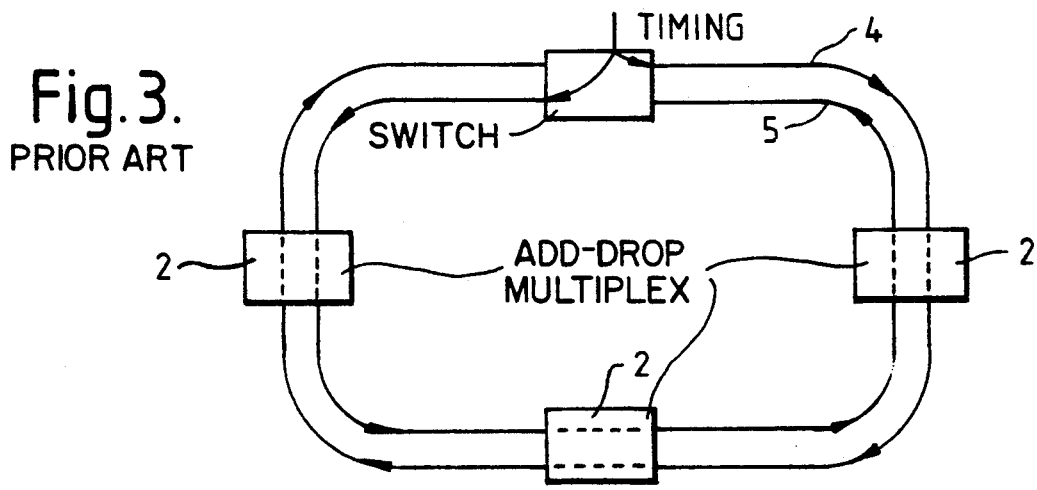
FIG. 3 is a similar diagram showing a contra-rotating ring.

Timing problems arise when it is required to send SDH traffic around a ring in contradirectional fashion. Such a ring is shown in FIG. 2 with the basic ring path shown at 1, add-drop multiplexes shown at 2, and the source direction selected by a switch 3. FIG. 3 shows timing information being sent round the ring 1 in different directions, the timing paths being shown at 4 and 5. This requirement arises because the SDH has the characteristic that traffic which is to be carried over an SDH network is first converted to a form which is synchronous with the network timing standard. This synchronisation is carried out by the process of "justification", referred to earlier. It can happen at up to two levels, the first being at "lower order virtual container (VC) level", and the second at "higher order virtual container (VC) level" which corresponds with a higher traffic capacity. A higher order VC may contain several lower order VCs, and once synchronised to the network becomes an "Administrative unit" or AU as already described.

Failure to carry out this justification process at the transmitting multiplexer, together with its complementary process at the receiver, can result in digital errors in the received traffic. Counter rotating timing is a method of maximising the probability that network timing will be available to every equipment on the ring, thus minimising the probability of causing errors by loss of synchronisation. The timing in each case is normally carried as a component of the traffic signal, embedded in that traffic by conventional transmission means such as scrambling or line coding.

Figure 4A:
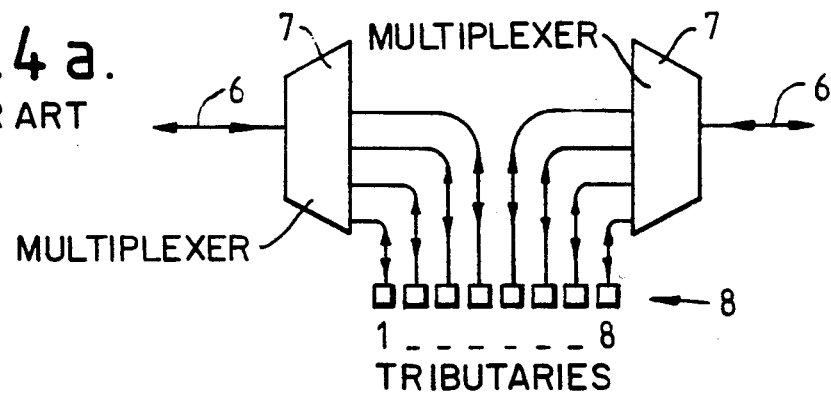
FIGS. 4(a) and 4(b) show respectively known methods in which tributaries can be introduced into a ring of the kind shown in either FIG. 2 or FIG. 3.
Figure 4B:
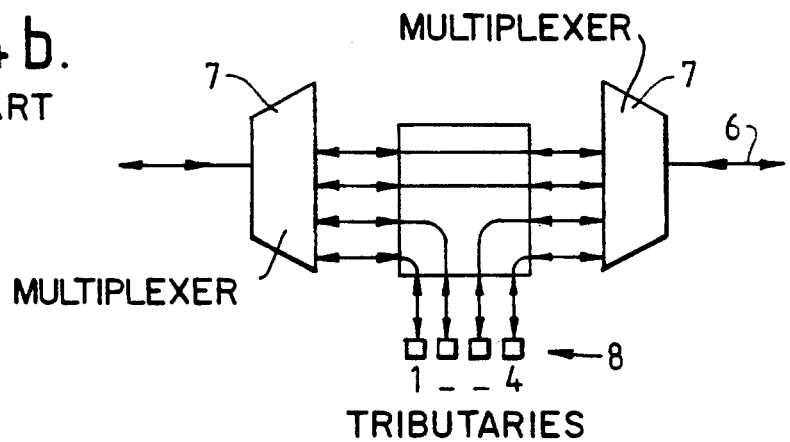

The equipment which carries out the multiplexing, demultiplexing, transmission and reception on a ring is typically an add-drop multiplex or ADM. An ADM can provide access to a proportion of the traffic passing through it, being a lower cost alternative to an equipment which fully demultiplexes and remultiplexes all through traffic. FIG. 4a shows a full multiplexer/demultiplexer where the aggregate through-traffic line is shown at 6, multiplexers at 7, and tributary circuits at 8. A typical ADM is shown at FIG. 4b and as can be seen it is possible to choose for only part of the through traffic to be accessed. An ADM functions conventionally by having a central switch to provide flexibility of access, together with a variable number of plug-in cards for "tributaries". These and the switch together allow the proportion of accessed traffic to be varied. Conventionally in an ADM, there is no requirement for the switch to allow components of the through traffic to do other than pass through or be accessed via tributaries.

However, in some applications it is of value to provide more flexible routing of traffic by making the switch into a cross-connect switch, thus allowing components of the aggregate through traffic to be sent back in the direction from which they came. Since it is axiomatic that all traffic in a synchronous system must be synchronous when it enters and leaves a synchronous switch, it is necessary that the timing components of traffic flowing from and into the switch in both directions be identical.

Figure 5:
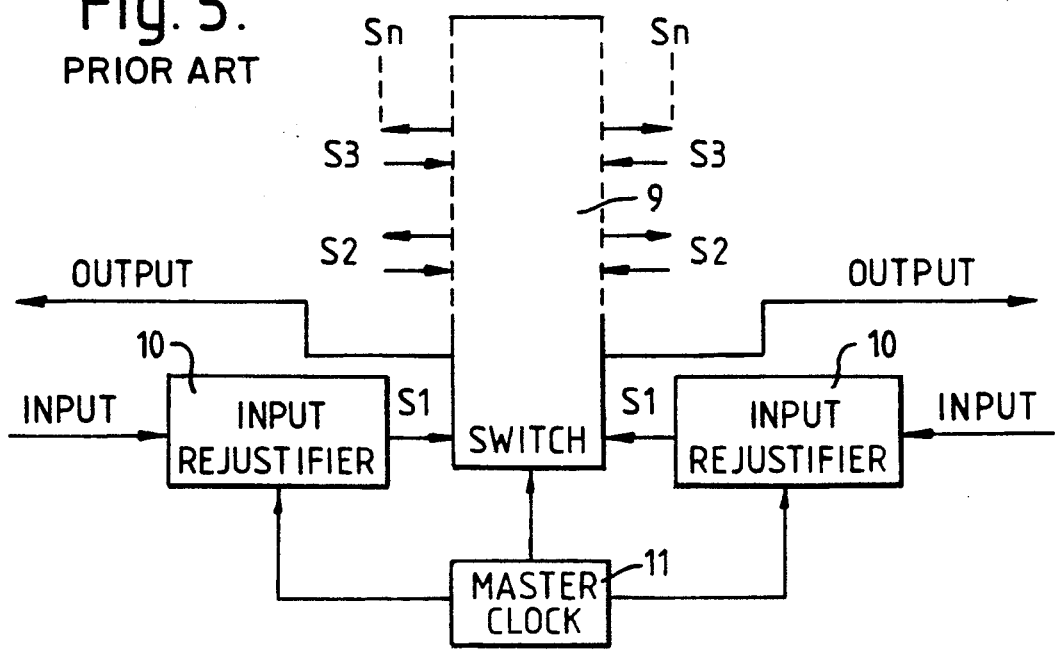
FIG. 5 is a diagram of a known switch in which both input sides include rejustifiers.

In practice it is difficult to arrange for the timing components of traffic flowing into the switch from both directions to be identical. Practical transmission impairments can cause the nominally identical timing components of two traffic signals to differ in terms of detailed phase movements over short and long terms; temperature-induced changes in propagation delay are one example of a cause for such differences. In order to accomodate these differences while still meeting the need for all inputs to be synchronous, a "rejustifier" is used on each input signal so that the signal can be transferred to a common timing standard within the switch. FIG. 5 shows such a known system. The main switch is shown at 9, with the inputs/outputs of the switch shown as S1 ... SN. Each input has an associated input rejustifier 10, and the switch 9 and rejustifier 10 are controlled by a master clock 11.

A "rejustifier" in SDH functions by adapting the "pointer" values which are used in SDH to relate a traffic signal to the timing standard against which it is referenced. As traffic signals enter an SDH cross-connect, they conventionally pass through a rejustifier which adjusts the pointer values of both lower order VC and higher order VC. As timing variations occur with temperature etc, these adjustments are dynamic, and apply uniquely to each VC so as to allow for its possibly unique route across the network to this switch. The result is that all of the traffic signals become synchronous to the switch timing.

Conventionally in a cross-connect, all traffic which leaves is synchronous with the local timing standard in that cross-connect. (Although nominally identical with the timing of other cross-connects in the network, this local timing may experience phase movements in relation to the timing of other elements in the network, as a result of temperature, network disturbances, etc).

Figure 6:
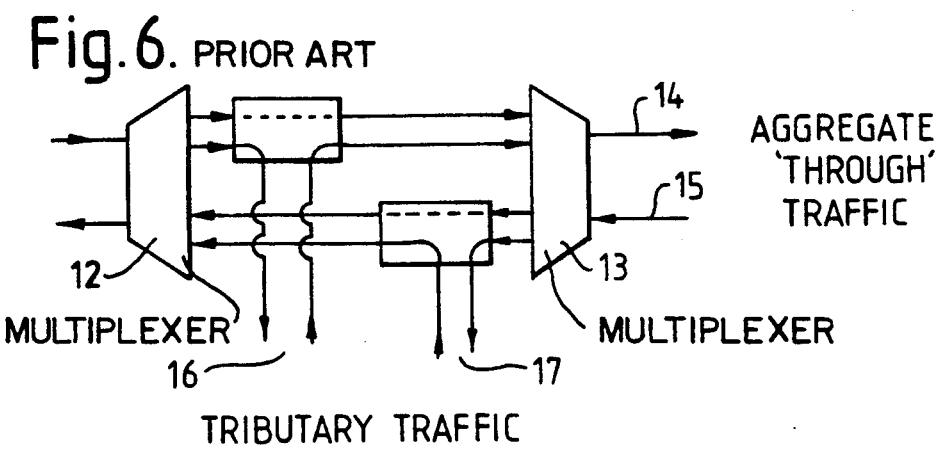
FIG. 6 shows a single switch having no cross connect functionality.

In the case of an ADM, the need to support counter-rotating timing for two potentially different timing components means that a single timing standard cannot be used for transmissions in both directions. The result is that SDH ADMs known to be proposed either have no cross-connect facility across a single switch or that they do have such a facility but cannot support counter-rotating tuning. A known SDH ADM is shown in FIG. 6 and comprises multiplexers 12 and 13 connecting aggregate through traffic paths 14, 15. As can be seen the tributary traffic at 16 and 17 cannot be cross-connected.

Figure 7:
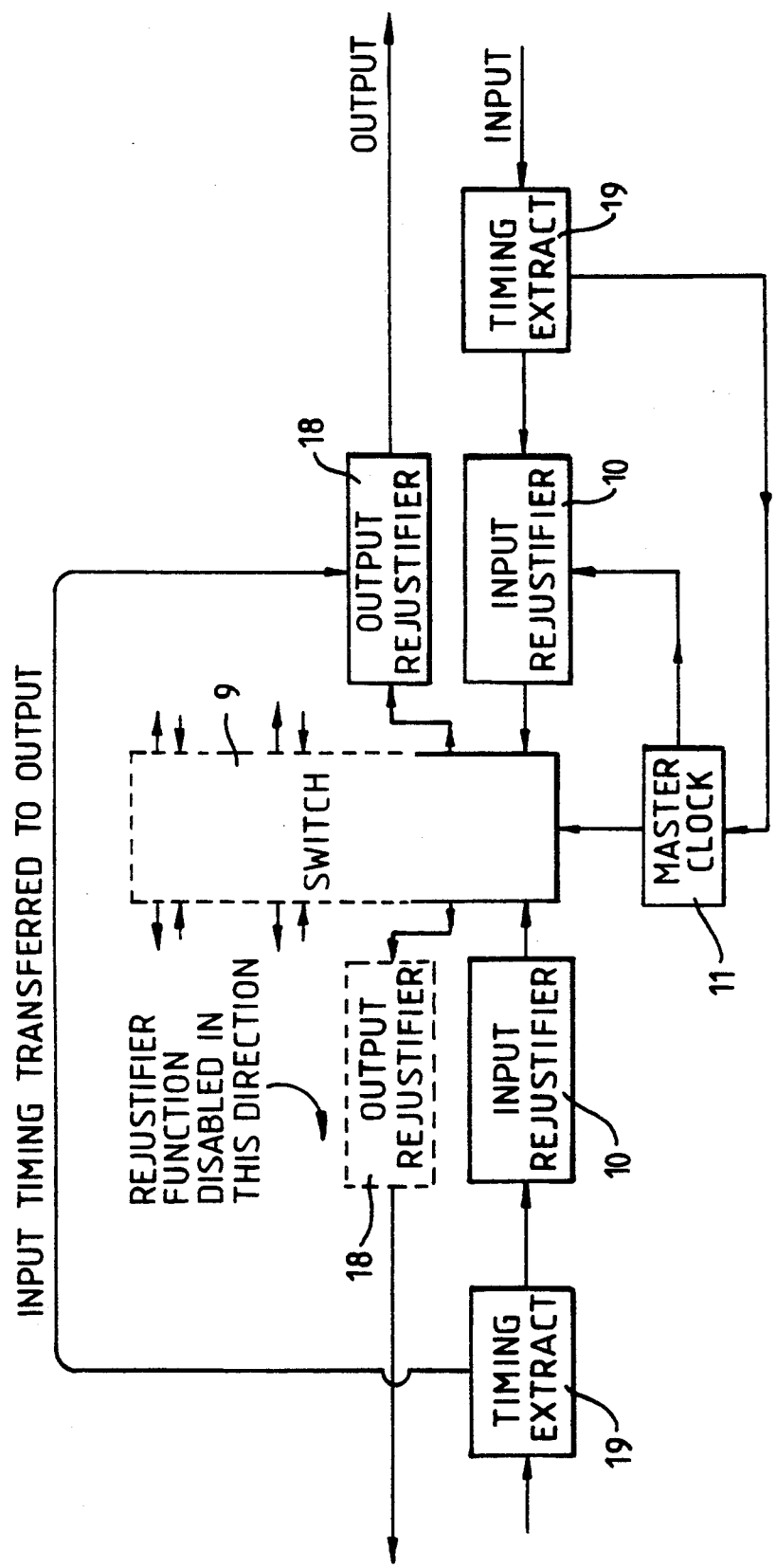
FIG. 7 shows a cross connect switch according to an embodiment of the present invention.

The present invention proposes a solution to this dilemma and an embodiment according to the present invention is shown at FIG. 7 in this embodiment. Further timing adapters or rejustifiers 18 are placed at the outputs to the network, so that timing can effectively be carried around the cross-connect switch. Each of the added output rejustifiers 18 has a timing signal transferred to it from a timing extract 19 associated with the relevant input rejustifier 10 at the other side of switch 9. In an ADM, there will normally be at least two such additional rejustifiers one for eastbound traffic, one for westbound. As a result, traffic entering from either direction can provide the timing reference for the switch, allowing protection against disruption of transmission around the ring. As can be seen the other circuit components are the same as those in FIG. 5.

These output rejustifiers 18 can be ranch simpler than the input rejustifiers since all of the VC within them are being adapted together from one timing standard to another. In practice this normally means that rejustification here is needed at AU level only, resulting in far fewer pointers to be adjusted than in the input rejustifiers.

This arrangement has the further advantage that all tributaries are synchronous with the switch timing standard, and so each tributary card needs to provide justification only once for each VC. The switch can then broadcast each VC in both directions around the ring. Without the output rejustifiers, the alternative method of sending each VC in both directions simultaneously would be to separately justify each VC for each direction, doubling the quantity of justification circuits.

The proposed method may be used with the previously known arrangement of having selection between the two nominally identical lower order VC received at the destination, with selection individual to each pair, and based for example on the overheads which are embedded in each VC for monitoring transmission quality. This arrangement protects against many possible types of fault which could affect an individual VC in transmission around the ring, and allows protection selection for a single VC to be performed without disturbing other VC.

I claim:

1. A data transmission system for Synchronous Digital Hierarchy multiplexed data, comprising:
    an add-drop multiplex having a pair of multiplexers for bi-directional transmission of said data, a switch connected to the multiplexers and having switch inputs and switch outputs, input tributaries connected to the switch inputs for adding traffic to said data, and output tributaries connected to the switch outputs for dropping traffic from said data;
    a plurality of input rejustifiers each connected to a respective switch input for adjusting for timing of said data entering the switch;
    a plurality of timing extracts each connected to a respective input rejustifier for generating respective timing signals; and
    an output rejustifier connected to one of the switch outputs for adjusting for timing of said data exiting the switch, said output rejustifier being connected to one of the timing extracts to receive one of the timing signals along a path bypassing the switch, thereby providing a timing reference for data entering one of the switch inputs at said one switch output.

2. The system of claim 1, and further comprising additional output rejustifiers, each connected to another of the switch outputs.

3. The system of claim 1, and further comprising a master clock connected to the switch, one of the input rejustifiers and one of the timing extracts.

4. The system of claim 1, wherein each rejustifier has means for adjusting data pointers, and wherein the output rejustifier adjusts fewer points than each input rejustifier.

* * * * *